(12) United States Patent
Schaff et al.

(10) Patent No.: US 7,536,594 B2
(45) Date of Patent: May 19, 2009

(54) WATCHDOG DEVICE THAT PROVIDES AND INTERRUPTS POWER TO A NETWORK DEVICE IN RESPONSE TO A LOCKUP ERROR CONDITION

(75) Inventors: Glen D. Schaff, Brookline, MA (US); Eric Louis, N. Chelmsford, MA (US)

(73) Assignee: Videogenix, Brookline, MA (US)

( * ) Notice: Subject to any disclaimer, the term of this patent is extended or adjusted under 35 U.S.C. 154(b) by 436 days.

(21) Appl. No.: 11/386,386

(22) Filed: Mar. 22, 2006

(65) Prior Publication Data

US 2008/0005626 A1 Jan. 3, 2008

Related U.S. Application Data

(60) Provisional application No. 60/665,416, filed on Mar. 25, 2005.

(51) Int. Cl.
*G06F 11/00* (2006.01)
(52) U.S. Cl. .......................................... 714/23; 714/55
(58) Field of Classification Search .................... 714/23, 714/55
See application file for complete search history.

(56) References Cited

U.S. PATENT DOCUMENTS

| | | | | |
|---|---|---|---|---|
| 4,654,821 | A  * | 3/1987 | Lapp ........................... | 713/330 |
| 5,511,161 | A  * | 4/1996 | Sato et al. ...................... | 714/23 |
| 6,611,285 | B1 * | 8/2003 | Morita ..................... | 348/211.3 |
| 6,711,613 | B1 * | 3/2004 | Ewing et al. ................. | 709/223 |
| 6,728,601 | B2 * | 4/2004 | Garcia et al. ................. | 700/286 |
| 7,130,667 | B2 * | 10/2006 | Jin et al. ...................... | 455/574 |
| 7,139,937 | B1 * | 11/2006 | Kilbourne et al. ............. | 714/47 |
| 2004/0019691 | A1* | 1/2004 | Daymond et al. ........... | 709/231 |
| 2005/0060567 | A1* | 3/2005 | Shannon et al. .............. | 713/200 |
| 2005/0206241 | A1* | 9/2005 | Saxena et al. .................. | 307/66 |

OTHER PUBLICATIONS

"The Rest of the Story" *Catalyst Interactive Communications System*. Raco Manufacturing & Engineering Company. Version 1.87, Feb. 23, 2004 (55 pages).

\* cited by examiner

*Primary Examiner*—Gabriel L Chu
(74) *Attorney, Agent, or Firm*—Wilmer Cutler Pickering Hale & Dorr LLP

(57) ABSTRACT

The invention relates to a stand-alone video recording, playback and Monitoring system. It has network switches, non-volatile storage devices, IP cameras, video servers, and NTSC cameras. The system uses communication channels that are WAN/LAN based and can be hard-wired or wireless and has a flexibly implemented watchdog to detect, for example, hardware and power failure as well as other failures in the system.

20 Claims, 3 Drawing Sheets

Camera Watchdog with Speaker alert and 1 to Many I/O

Enterprise System
Networked Video System

CCTV Analog Video Solution Evolution
market adoption early 1970s

Analog Surveillance constraints included limited time to tape
very low fps video capture rate and standalone manual operation DVR major drawbacks include lack of scalability and degree of technical expertise and hands-on configuration required to integrate. DVRs are not typically network ready and have fixed, non-scalable storage and is based on analog MUX time lapse recording technology.

Supported NVR Camera Connections

Camera Watchdog with Speaker alert and 1 to Many I/O

WATCHDOG DEVICE THAT PROVIDES AND INTERRUPTS POWER TO A NETWORK DEVICE IN RESPONSE TO A LOCKUP ERROR CONDITION

This application claims the benefit of provisional application U.S. Ser. No. 60/665,416, filed Mar. 25, 2005, which is hereby incorporated by reference into the subject application in its entirety. A portion of the disclosure of this patent document contains material to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates generally to video monitoring, surveillance and recording systems, and, more particularly, to a peripheral video delivery, archival, and playback system adapted for stand-alone use and operation supporting multiple users at separate remote interfaces capable of simultaneous access and system administration.

BACKGROUND OF THE INVENTION

The present invention relates to video delivery, recording and monitoring systems, and more particularly to a LAN/WAN based system where both the user and administrator interface need not be local to the system but can be on any remote node either attached to the main system via a Local Area Network (LAN) or Wide Area Network (WAN).

Since the early 70s various analog electronic video systems have been available for viewing and recording video. These systems are described as Closed Circuit TV (CCTV) systems. CCTV systems support cameras designed to transmit standard television input signals designed by the National Television System Committee (NTSC) in 1953[1]. A CCTV system supports multiple NTSC cameras connected to NTSC multiplexer which in turn connected to a video display and possibly a time lapse recorder (the video in this description never leaves the analog domain). This system is a closed loop system where video does not migrate outside the site where the system resides. Such multiplexing devices include: Panasonic WJFS409, Sony YS-DX516.

[1] NTSC
NTSC stands for National Television System Committee, which devised the NTSC television broadcast system in 1953. NTSC is also commonly used to refer to one type of television signal that can be recorded on various tape formats such as VHS, ¾" U-matic and Betacam.
The NTSC standard has a fixed vertical resolution of 525 horizontal lines stacked on top of each other, with varying amounts of "lines" making up the horizontal resolution, depending on the electronics and formats involved. There are 59.94 fields displayed per second. A field is a set of even lines, or odd lines. The odd and even fields are displayed sequentially, thus interlacing the full frame. One full frame, therefore, is made of two interlaced fields, and is displayed about every ⅟30 of a second.

Recently in the late 90s, a trend has started to replace the time lapse recorder with a digital video recorder (DVR). The DVR converts NTSC output from the video multiplexer to packets of digitized video and stores the now digitized video in files on a hard drive. More recently, DVR began to combine the functionality of the DVR and multiplexer into a single unit. Such devices include: Pelco DX-9000, DVMRc4CT40 GE/Kalatel, Sony HSRX216/32.

An example of a DVR configuration is shown in FIG. 3. This example shows a monitor plugged into a DVR. The DVR also connects to the multiplexer, which takes analog video feeds from all the cameras. By timesharing analog video streams, the DVR converts each video stream internally to digital and then saves the video on a hard drive that may be internal to the DVR itself.

In the past several years a few systems have emerged where the system no longer requires traditional analog cameras transmitting NTSC video signals. These systems connect to a network of digital IP cameras, (typically using TCP/IP). The DVR is replaced with a network video recorder (NVR, FIG. 1 item 3) which receives digitized video packets directly from cameras or devices known as video servers. Such cameras UP include: DLINK DCS-1000W, AXIS 2100, and VivoTek 3133 (FIG. 1 items 1/2).

FIG. 4 shows a variety of network camera configurations that support the digital or IP video model described above. The first example is a digital IP camera physically connected to the network. The second example shows an analog camera connected to a video server (that converts analog video to digital video) and thus can deliver IP video across the network. Example 3 is a digital IP camera with a built in wireless transmitter. The transmitter talks to a device such as a wireless access point that then physically connects to the network. Example 4 shows a wireless Ethernet bridge connecting to a, normally wired Ethernet (or IP camera). Example 5 shows the same configuration as 3 but the video server is now a wireless video server that talks to a wireless receiver such as an access point. Example 6 is the combination of a wireless Ethernet bridge connected to a device as described in item 2 (wired Ethernet video server).

This form of a video management system has made it possible for video information to be processed as is any form of digital data and made available to any network connected system or user. Networked video system becomes an immediate beneficiary of other stand-alone networking peripherals that exist in the market place. Such peripherals include: network hard drives, network servers, and other forms of network mass storage systems.

In general once video data is digitized it can be referenced in its raw data form from any "connected" system. The migration from single-ended video systems into fully networked solutions introduces many new complexities to a once simply managed closed-loop system. Along with the complexities are enormous new possibilities for management, processing and usage of the now digitized data What is desired is to handle the situation where a remote networked device (IP camera/IP video server) locks up or hangs and cannot be restarted from the remote device server or any other such remote mechanism.

SUMMARY OF THE INVENTION

The present invention is a device that can be either a built-in, or an add-on external attachment, to an existing IP camera or video server (in the following description IP Camera and IP video server are interchangeable, see FIG. 5). The mechanism provides for detection and recovery from either a network communication latch up, or another such local software/hardware latch up that may occur. The device works in conjunction with a communication stream from the remote server. If the device detects a communication disconnect, it has the capability of cycling power (and thus resetting) the local IP video server or camera. Additionally the device can support an audible alarm (similar to smoke detectors) so as to alert individuals that a latch up has occurred at the device. As shown in FIG. 5, the camera watchdog works independently of the type of the physical communication mechanisms from camera to the remote device. The I/O watchdog resides on the camera, and if the camera stops responding to a sequence of expected communications from the server it goes into a fault mode. If the fault mode persists, the watchdog determines that a device latch up has occurred and will restart the failed element. This watchdog may be internal or external to the camera. FIG. 5 also shows that the power from the transformer goes from the watchdog to the camera thus eliminating the need for an additional watchdog transformer (external watchdog only).

The device may also have an optional power detection circuit to detect local power failure. This requires an internal battery to drive the alarming element at the device during a condition of power failure. As illustrated below, the device can be retrofitted externally to any existing IP network unit with external I/Os, or can be built into the unit by the hardware manufacturer. For the external device, power can be derived directly from an IP camera's power source which is then passed on to the camera so that no additional power supply is required. Communication failure is detected using an external I/O port on the camera that is driven by a remotely connected device. If a required I/O sequence is not detected on the external I/O of the IP camera, then the device goes into a fault mode and can recycle power to the IP camera/video server. If communication does not get reestablished the device can also assert a periodic audible alarm at the camera end.

Additionally, the external device can be equipped with its own set of multiple I/O ports so that a single I/O from any video server can be used to drive many outputs using a command from a remote device that includes I/O port address and data. These multiple output ports can be physical I/O ports, or individual wireless communication ports, such as those supported by the X10 wireless protocol.

The objects, advantages and other novel features of the present invention are apparent from the following detailed description when read in conjunction with the appended claims and attached drawing.

DESCRIPTION OF THE PREFERRED EMBODIMENT

Figure 1:
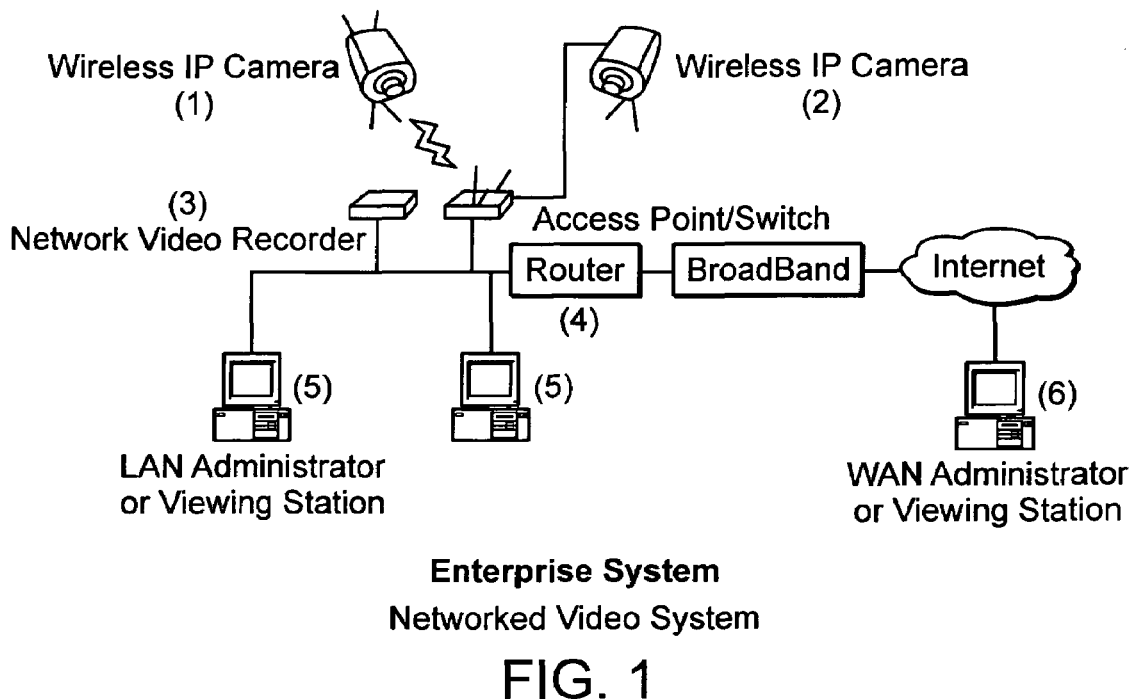
FIG. 1 is a block diagram view of a network video management system with wireless and wired IP cameras. This drawing has computers on the local subnet and is physically connected to the intranet by a broadband router (item 4).
Figure 2:
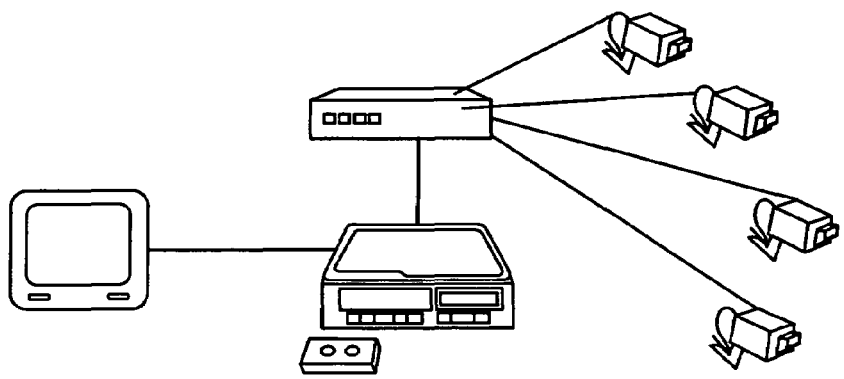
FIG. 2 is a block diagram of a typical CCTV video system.
Figure 3:
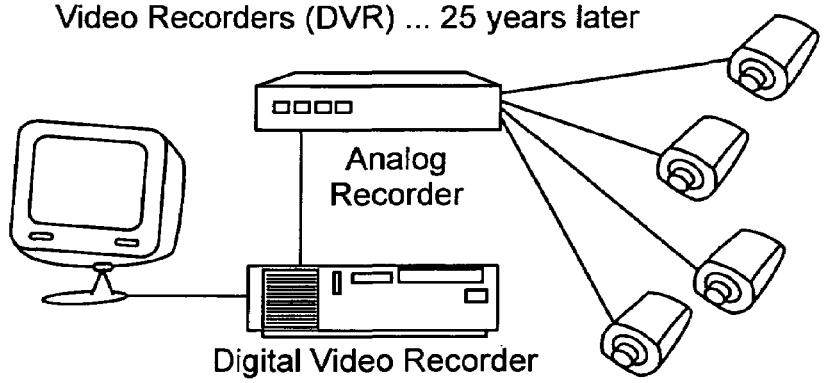
FIG. 3 is a block diagram of a CCTV system wired to a Digital Video Recorder (DVR).
Figure 4:
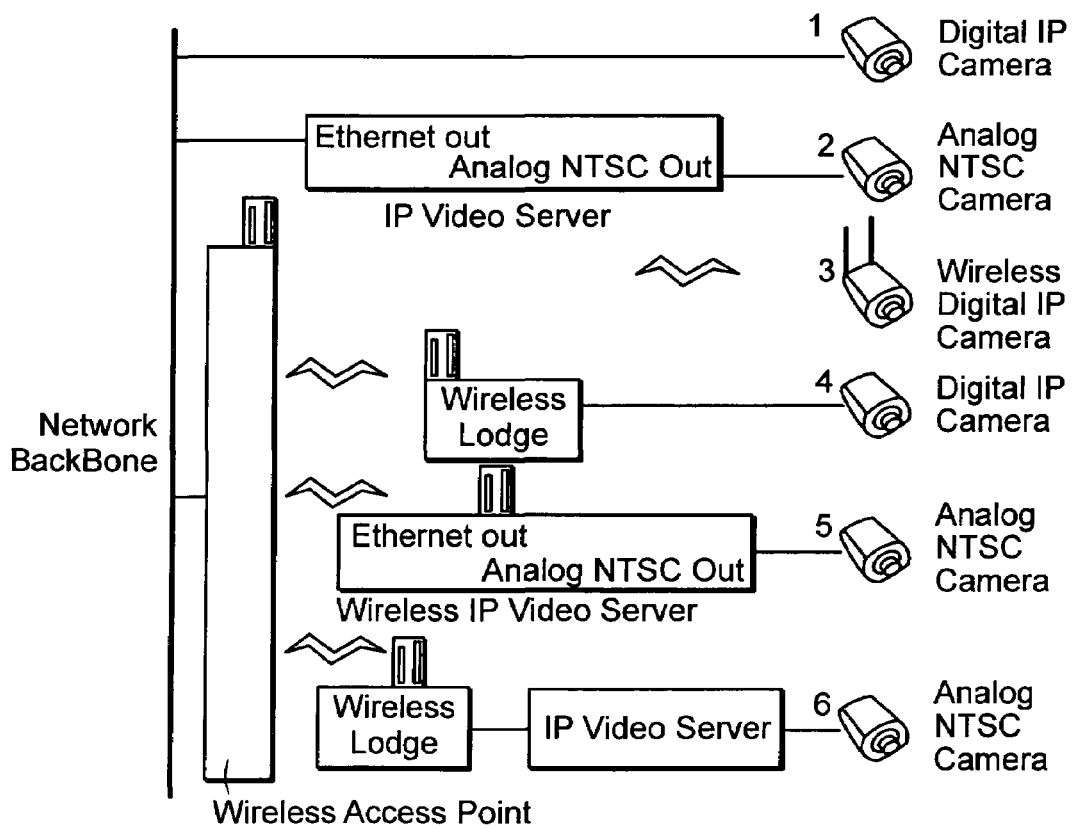
FIG. 4 is a block diagram showing standard IP camera and Video Server configurations in a networked environment.
Figure 5:
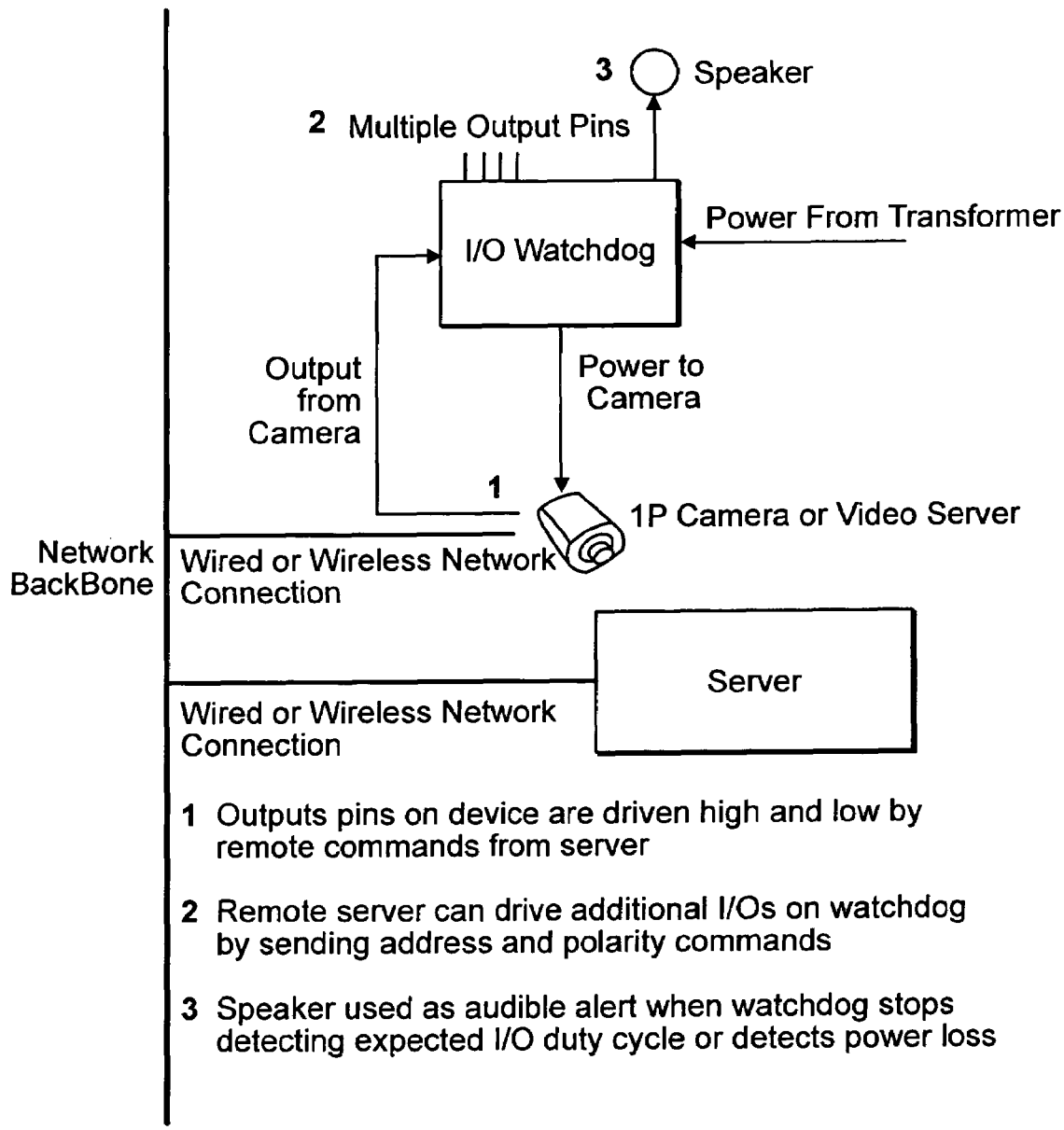
FIG. 5 is a block diagram of the external I/O hardware watchdog with an attached optional speaker and external I/Os.

System Description:

Referring now to FIG. 1 a networked video system includes a network video management server (host computer) that communicates to all other devices via TCP/IP or UDP, an Ethernet router (item 4), any number of wired or wireless IP cameras (items 1 and 2), Ethernet switches and wireless access points and a non-volatile storage mechanism (i.e. hard drive). Access to system resources (such as cameras) is established by the host computer with physical connectivity to attached devices managed by a hardware router (FIG. 1, item 4). The router can manage connectivity to both local clients on the router's private internal subnet, and remote clients via an external broadband connection. Remote desktop viewing or administration stations can be any client computer physically attached to the internet/intranet (FIG. 1, item 6/5) capable of running an industry standard browser such as Microsoft IE. The system is protected from outside intrusion via a hardware firewall that sits between the broadband modem, and the private network of the system router. (See provisional patent 60/436,346, Dec. 26, 2002).

Failure and Recovery Mechanisms:

One major weakness when migrating from totally analog CCTV solutions to digital solutions is that each device has multiple points of failure including internal device hardware errors, algorithmic errors and communication lockup. As the market migrates to IP video devices a mechanism needs to exist for alerting users of problems at cameras and fixing those problems automatically if possible. To do this, an aftermarket watchdog is implemented that uses the external I/Os from the camera to determine both communication failure and software latch up. This watchdog can also detect hardware and power failure.

The watchdog can use the I/O ports from the IP video device for monitoring device communication at an expected duty cycle. In this case, it is attached to an output from an I/O port of the IP video device. The output terminal at the device will be driven by a remotely connected device. If the expected duty cycle for the output is not detected by the hardware watchdog, it can cycle power to the IP video device thereby causing a hard reboot of the device. This mechanism will work on either hard-wired (CAT-5/Cable etc. . . . ) or wireless (802.11x) connections.

Wireless I/Os

The system includes a device to receive and transmit encoded commands to control and monitor external wireless devices from a wired source. The wired source connects directly to IP video device. The commands are received and can be transmitted using wired or wireless media including but not limited to RF or Infra-Red.

When a received command matches a predefined code, a specific output toggles or is set to a specific state. The device has multiple outputs allowing multiple commands to be received and the associated output changes state based on the command.

The transmitted commands are sent based on the state of an input. The device has multiple inputs allowing commands to be sent based on the associated input that changed state.

The device has a universal power input allowing it to be powered by a wide range of power sources. The power source connectors are pass-through, allowing the power to be daisy-chained through the device to the wired source. The device uses microcontroller allowing many different protocols to be used. (See provisional patent 60/487,271, Jul. 16, 2003).

What is claimed:

1. A method of recovering from a fault condition of a network device, comprising:

receiving, by a watchdog device, an indication of activity from the network device, wherein the watchdog device (i) provides power to the network device and (ii) receives the indication of activity from the network device, but does not otherwise share electrical resources of the network device;

providing, from a control source, information to the network device, wherein the network device generates the indication of activity based on the information;

making, based on the indication of activity, a determination regarding whether the network device is in a lockup error condition; and, interrupting, by the watchdog device, power to the network device if the determination is that the network device is in the lockup error condition.

2. The method of claim 1, wherein the network device is an IP video device.

3. The method of claim 1, wherein the watchdog device is disposed external to the network device.

4. The method of claim 3, wherein the watchdog device is fixedly attached to the network device.

5. The method of claim 1, wherein the watchdog device is disposed within the network device.

6. The method of claim 1, wherein the control source is an application residing on a remotely located network device.

7. The method of claim 1, wherein the indication of activity includes an output signal from the network device.

8. The method of claim 7, wherein making a determination further includes evaluating a command sequence of the output signal, and determining that the network device is in the lockup condition if the command sequence of the output signal does not conform to an expected command sequence characteristic.

9. The method of claim 1, further including performing the receiving, providing, making and interrupting steps a predetermined number of consecutive times if the lockup error condition continues, and identifying a persistent fault mode if the lockup error continues after performing the receiving, providing, making and interrupting steps the predetermined number of consecutive times.

10. The method of claim 9, further including producing an audible alarm if the persistent fault mode is identified.

11. A system for recovering from a fault condition of a network device, comprising:

a watchdog device for receiving an indication of activity from the network device, wherein the watchdog device (i) provides power to the network device and (ii) receives the indication of activity from the network device, but does not otherwise share electrical resources of the network device;

a control source for providing information to the network device, wherein the network device generates the indication of activity based on the information;

wherein the watchdog device (i) makes, based on the indication of activity, a determination regarding whether the device is in a lockup error condition, and (ii) interrupts power to the network device if the determination is that the network device is in the lockup error condition.

12. The system of claim 11, wherein the network device is an IP video device.

13. The system of claim 11, wherein the watchdog device is disposed external to the network device.

14. The system of claim 11, wherein the watchdog device is fixedly attached to the network device.

15. The system of claim 11, wherein the watchdog device is disposed within the network device.

16. The method of claim 11, wherein the control source is an application residing on a remotely located network device.

17. The system of claim 11, wherein the indication of activity includes an output signal from the network device.

18. The system of claim 17, wherein the watchdog device makes the determination by evaluating a command sequence of the output signal, and determining that the network device is in the lockup condition if the command sequence of the output signal does not conform to an expected command sequence characteristic.

19. The system of claim 11, wherein the watchdog device interrupts power to the network device a predetermined number of consecutive times if the lockup error condition continues, and identifies a persistent fault mode if the lockup error condition continues after interrupting power to the network device the predetermined number of consecutive times.

20. The system of claim 19, further including producing an audible alarm if the persistent fault mode is identified.

\* \* \* \* \*